United States Patent
Umansky et al.

(10) Patent No.: US 9,290,703 B2
(45) Date of Patent: Mar. 22, 2016

(54) LOW PRESSURE PRODUCTION OF LOW CLOUD POINT DIESEL

(75) Inventors: Benjamin S. Umansky, Fairfax, VA (US); Mohan Kalyanaraman, Media, PA (US); Timothy L. Hilbert, Fairfax, VA (US); Carlos N. Lopez, Amissville, VA (US); Lei Zhang, Cherry Hill, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 968 days.

(21) Appl. No.: 12/799,363

(22) Filed: Apr. 23, 2010

(65) Prior Publication Data

US 2011/0259793 A1    Oct. 27, 2011

(51) Int. Cl.
*C10G 45/02* (2006.01)
*B01D 3/14* (2006.01)
(Continued)

(52) U.S. Cl.
CPC .............. *C10G 45/02* (2013.01); *B01D 3/141* (2013.01); *C10G 45/58* (2013.01); *C10G 45/64* (2013.01); *C10G 65/043* (2013.01); *C10L 1/08* (2013.01); *C10G 2300/202* (2013.01); *C10G 2300/304* (2013.01); *C10G 2300/4018* (2013.01); *C10G 2400/04* (2013.01)

(58) Field of Classification Search
CPC ...... C10G 45/02; C10G 45/64; C10G 65/043; C10G 45/58; C10G 2300/4018; C10G 2300/304; C10G 2300/202; C10G 2400/04; C10L 1/08; B01D 3/141

USPC ........... 585/240; 208/89, 57, 208 R, 209, 212
See application file for complete search history.

(56) References Cited

U.S. PATENT DOCUMENTS 3,314,879 A * 4/1967 Lacy et al. ................... 208/356
3,412,016 A   11/1968 Graven
(Continued)

FOREIGN PATENT DOCUMENTS

EP          819752 B1    4/2001
WO       2009088454     7/2009
WO       2009116988     9/2009

OTHER PUBLICATIONS

Christian Baerlocher, Lynne B. McCusker, David H. Olson, MFI—Pnma, Atlas of Zeolite Framework Types (Sixth Edition), Elsevier Science B.V., Amsterdam, 2007, pp. 212-213, ISBN 9780444530646, http://dx.doi.org/10.1016/B978-044453064-6/50287-5. (http://www.sciencedirect.com/science/article/pii/B9780444530646502875).*

(Continued)

*Primary Examiner* — Randy Boyer
*Assistant Examiner* — Juan Valencia
(74) *Attorney, Agent, or Firm* — David M. Weisberg; Glenn T. Barrett; Chad A. Guice

(57) ABSTRACT

A diesel fuel product with beneficial cold flow properties can be produced. A suitable feedstock for forming a diesel boiling range product can be hydrotreated to have a sulfur content of at least about 100 wppm and then dewaxed. This two stage process can allow for production of an arctic or winter diesel without use of high pressures. Optionally, a divided wall column fractionator can be used to allow a single separation stage to handle the effluent from both the hydroprocessing and the dewaxing stages.

17 Claims, 4 Drawing Sheets

(51) Int. Cl.
*C10G 45/58* (2006.01)
*C10G 65/04* (2006.01)
*C10L 1/08* (2006.01)
*C10G 45/64* (2006.01)

(56) References Cited

U.S. PATENT DOCUMENTS

| | | | |
|---|---|---|---|
| 4,229,282 A | | 10/1980 | Peters et al. |
| 4,474,618 A | * | 10/1984 | Yen et al. ............... 208/111.35 |
| 4,913,797 A | * | 4/1990 | Albinson et al. ............... 208/89 |
| 6,217,749 B1 | * | 4/2001 | Espeillac et al. ............. 208/213 |
| 6,261,441 B1 | | 7/2001 | Gentry et al. |
| 6,372,949 B1 | * | 4/2002 | Brown et al. ............... 585/639 |
| 6,582,590 B1 | * | 6/2003 | Riley et al. ............... 208/210 |
| 7,077,948 B1 | * | 7/2006 | Barre et al. ............ 208/111.35 |
| 2002/0189972 A1 | * | 12/2002 | Benazzi et al. ............... 208/57 |
| 2003/0085152 A1 | * | 5/2003 | Dahlberg et al. ............... 208/57 |
| 2004/0065586 A1 | * | 4/2004 | Jiang ............................... 208/27 |
| 2004/0232045 A1 | * | 11/2004 | Simmons et al. ............... 208/89 |
| 2005/0092654 A1 | * | 5/2005 | Ellis et al. ....................... 208/89 |
| 2005/0269245 A1 | * | 12/2005 | Huve ............................... 208/89 |
| 2007/0205138 A1 | | 9/2007 | Wardle et al. |
| 2010/0018896 A1 | | 1/2010 | Gorbaty et al. |
| 2010/0075831 A1 | | 3/2010 | Elia et al. |
| 2010/0084313 A1 | * | 4/2010 | Helton et al. ................... 208/60 |
| 2010/0147748 A1 | * | 6/2010 | Wei et al. ....................... 208/219 |
| 2011/0132803 A1 | | 6/2011 | Umansky et al. |

OTHER PUBLICATIONS

T. L Hilbert, G. K. Chitnis, B. S. Umansky, P. W. Kamienski, V. Patel, A. Subramanian; "Consider new technology to produce 'clean' diesel," Hydrocarbon Processing, Feb. 2008, pp. 47-56.

Philip. L. Cottingham, "Distribution of Nitrogen in Hydrocracked in Situ Shale Oil," Ind. Eng. Chem., Prod. Res. Dev., vol. 15, No. 3, 1976, pp. 197-201.

MFI (Framework) from International Zeolite Association Database, http://www.iza-structure.org/databases/, 2007 (Downloaded on Oct. 28, 2013).

MFI (Type Material) from International Zeolite Association Database, http://www.iza-structure.org/databases/, 2007 (Downloaded on Oct. 28, 2013).

MRE (Framework) from International Zeolite Association Database, http://www.iza-structure.org/databases/, 2007 (Downloaded on Oct. 28, 2013).

* cited by examiner

| Run | 1 | 2 | 3 | 4 | 5 | 6 | 7 |
|---|---|---|---|---|---|---|---|
| Weighted average bed T (°C) | 376 | 380 | 377 | 377 | 349 | 381 | 375 |
| LHSV for dewaxing stage (hr$^{-1}$) | 3.32 | 3.75 | 3.10 | 3.29 | 3.32 | 3.33 | 2.4 |
| Sulfur after hydrotreatment (wppm) | 23 | 44 | 22 | 2 | 46 | 51 | 20 |
| Nitrogen after hydrotreatment (wppm) | 1 | 3 | 1 | 1 | 4 | 5 | 1 |
| Sulfur after dewaxing (wppm) | 1 | 2 | 2 | 1 | 9 | 3 | 2 |
| % sulfur removal | 96 | 95 | 91 | 50 | 80 | 94 | 90 |
| Nitrogen after dewaxing (wppm) | 0.3 | 0.4 | 0.6 | 0.4 | 0.5 | 0.5 | 0.4 |
| % nitrogen removal | 70 | 87 | 40 | 20 | 88 | 90 | 60 |
| Cloud point after dewaxing (°C) | -17 | -17 | -17 | -16 | 0 | -16 | -17 |

FIG. 4

LOW PRESSURE PRODUCTION OF LOW CLOUD POINT DIESEL

FIELD OF THE INVENTION

This invention provides methods for multi-stage hydroprocessing using a divided wall column as a fractionator.

BACKGROUND OF THE INVENTION

The equipment necessary for refining operations is one of the major sources of costs in a refinery. The equipment can include catalytic reactors, fractionators and/or separators, and other supporting equipment. In a conventional process train, each catalytic reactor can have a dedicated fractionator or separator associated with the reactor, to separate out the various products produced in the catalytic reaction stage.

One method for saving on capital costs is to allow more than one reactor to use the same fractionator. U.S. Pat. No. 3,412,016 shows an example of a fractionator that includes multiple volumes. In U.S. Pat. No. 3,412,016, two independent refinery gasoline streams (such as a low octane and a high octane gasoline) are fractionated in the fractionator. In the fractionator, the light ends portions of the two gasoline fractions are allowed to mix. However, there is no description or suggestion of any interaction, recycling, or other mixing of the gasoline "bottoms" portions. The outputs from the fractionator are a light fraction and the two distinct heavy fractions.

European Publication No. EP 0819752 appears to provide another example of using a fractionator having multiple volumes. In this reference, it appears that two separate input streams are provided to the fractionator. The vapor portions produced in each side of the fractionator are allowed to mix, leading to production of one or more light product fractions from the fractionator. Each side of the fractionator also produces a bottoms portion. In some figures, the bottom portions appear to remain separated after leaving the fractionator, while in other figures the input to the second side of the fractionator includes portions of the bottoms from both sides of the fractionator.

SUMMARY OF THE INVENTION

One aspect of the invention relates to a method for producing low sulfur distillate products, comprising: hydrotreating a feedstock having a sulfur content of at least about 1500 wppm under effective hydrotreating conditions to produce at least a liquid fraction; separating the liquid fraction from a gas phase fraction, the separated liquid fraction having a sulfur content of at least about 100 wppm; hydroprocessing at least a portion of the separated liquid fraction under effective dewaxing conditions in the presence of a catalyst including at least one Group VIII metal on a bound zeolite, the bound zeolite comprising a one-dimensional 10-member ring zeolite; and fractionating the hydroprocessed liquid fraction to produce at least a product fraction, the product fraction having a sulfur content of about 15 wppm or less, a nitrogen content of about 5 wppm or less, and a cloud point of about −15° C. or less.

Another aspect of the invention relates to a method for producing low sulfur distillate products, comprising: hydrotreating a feedstock having a sulfur content of at least about 1500 wppm under effective hydrotreating conditions; fractionating the hydrotreated feedstock in a first volume of a divided wall column fractionator to produce at least a liquid fraction and a first common fraction that is passed to an upper undivided volume of the fractionator, the liquid fraction having a sulfur content from about 200 wppm to about 500 wppm; hydroprocessing at least a portion of the liquid fraction under effective dewaxing conditions in the presence of a catalyst including at least one Group VIII metal on a bound zeolite, the bound zeolite comprising a one-dimensional 10-member ring zeolite; and fractionating the hydroprocessed liquid fraction in a second volume of the divided wall column fractionator to produce at least a product fraction and a second common fraction that is passed to the upper undivided volume of the fractionator, the product fraction having a sulfur content of about 15 wppm or less, a nitrogen content of about 5 wppm or less, and a cloud point of about −15° C. or less.

Yet another aspect of the invention relates to a method for producing low sulfur distillate products, comprising: hydrotreating a feedstock having a sulfur content of at least about 1500 wppm under effective hydrotreating conditions to produce at least a liquid fraction; hydroprocessing at least a portion of the liquid fraction, the at least a portion of the liquid fraction having a sulfur content of at least about 100 wppm, under effective dewaxing conditions in the presence of a catalyst including at least one Group VIII metal on a bound zeolite, the bound zeolite comprising a one-dimensional 10-member ring zeolite, the at least one Group VIII metal comprising Ni; and fractionating the hydroprocessed liquid fraction to produce at least a product fraction, the product fraction having a sulfur content of about 15 wppm or less, a nitrogen content of about 5 wppm or less, and a cloud point of about −15° C. or less.

BRIEF DESCRIPTION OF THE FIGURES

FIG. 4 shows results for sulfur removal from a feed under hydrotreating and catalytic dewaxing conditions.

DETAILED DESCRIPTION OF THE EMBODIMENTS

Figure 1:
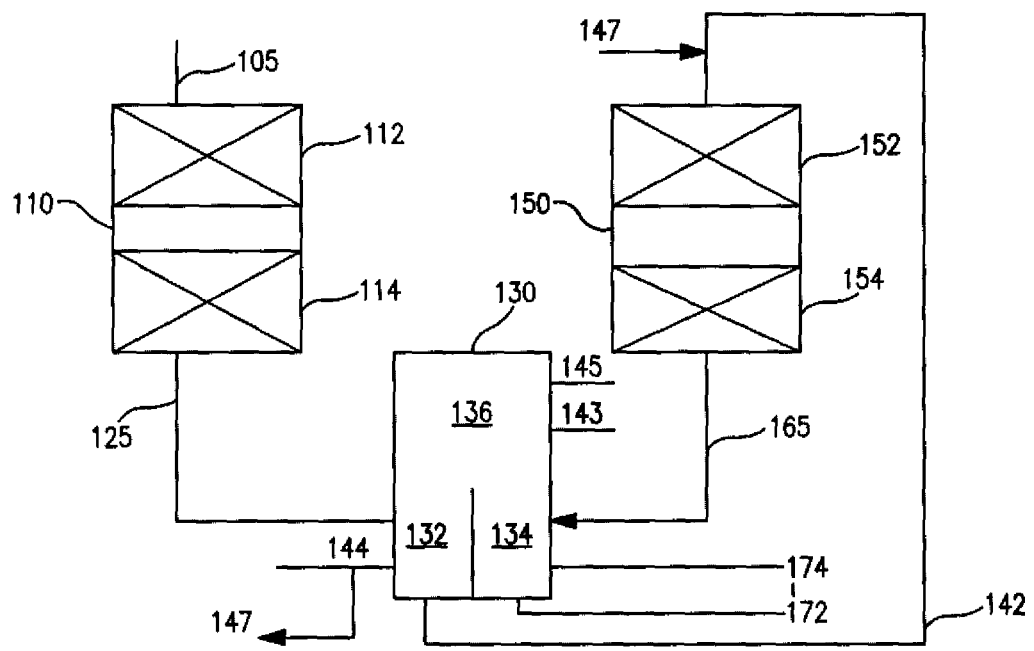
FIG. 1 schematically shows a reaction system for performing a process according to an embodiment of the invention.

In various embodiments, systems and methods are provided for producing low sulfur diesel fuels that also have improved low temperature properties. The diesel fuels can be produced using a two stage process that operates at relatively low pressures, such as below about 800 psig (about 5.5 MPag) or below about 700 psig (about 4.8 MPag), while maintaining a good lifetime for the catalysts in the process. A first hydrotreatment stage can be used to reduce the sulfur content of the feed to at least about 100 wppm, for example about 100 wppm to about 500 wppm or about 200 wppm to about 500 wppm. A dewaxing stage can then be used to remove additional sulfur while also improving the cold flow properties of the diesel fuel. Preferred catalysts and conditions for the dewaxing stage are discussed in more details below. In some embodiments, a further advantage can be gained by using a divided wall column fractionator in place of having dedicated separators or fractionators for each stage of the process.

Performing a hydroprocessing reaction at a (relatively) lower hydrogen partial pressure can provide a variety of advantages. Operating at a (relatively) lower pressure reduces the amount of energy that is spent to compress gases to the desired operating pressure. Additionally, older refinery processing units were often designed to operate at such lower pressures, as the historical requirements for sulfur and nitrogen removal were less stringent. If these heritage refinery units are modified to handle higher pressures, such as pressures of up to about 1200 psig (about 8.3 MPag), current sulfur target levels can be readily achieved for a typical feedstock. However, upgrading these heritage units to handle higher pressures can require significant capital expenditure. Thus, it would be beneficial to identify processes that can satisfy current requirements for sulfur and nitrogen without requiring expensive upgrading of equipment.

In order to satisfy current and future regulatory requirements for sulfur content in diesel fuels, it can be desirable to reduce the sulfur content of a diesel fuel to less than about 15 wppm, for example less than about 10 wppm or less than about 8 wppm. One method for improving sulfur removal without increasing the hydrogen pressure can be to increase the reaction temperature. Increasing the reaction temperature during hydroprocessing can typically result in relatively higher activity for the hydrotreatment catalysts, and can therefore improve sulfur removal. However, increasing the reaction temperature can also typically reduce the lifetime of the catalyst. Modifying the space velocity by adding more catalyst and/or reducing the flow rate of feedstock can also improve performance; however, this can also drive up costs, as an increased amount of catalyst can be needed to generate a given flow rate of hydroprocessed feedstock.

Another option for improving sulfur removal can be to add a second hydrotreatment stage with a separator between the stages. Adding a second hydrotreatment stage can allow for use of an increased amount of catalyst. A separator can allow for a reduction in the amount of gas phase contaminants, such as $H_2S$ and $NH_3$, that are present in the feed due to the first hydrotreatment stage. However, a second hydrotreatment stage will typically not provide an improvement in the cold flow properties of the resulting diesel fuel product.

In some embodiments, a combination of a hydrotreatment stage and a dewaxing stage can allow for lower cost production of diesel fuel with a sulfur content of about 15 wppm or less, for example about 10 wppm or less or about 8 wppm or less. In such an embodiment, the hydrotreatment stage can be used to reduce the sulfur content of a feedstock to a suitable level. The effluent from the hydrotreatment stage can then undergo a separation to remove gas phase contaminants, such as $H_2S$ or $NH_3$, that can form during hydrotreatment. The liquid portion of the separated effluent can then be passed to a dewaxing stage. A suitable level of hydrotreatment can correspond to a separated, hydrotreated effluent that enters the dewaxing stage with a sulfur content of about 500 wppm or less, for example about 400 wppm or less or about 300 wppm or less. Additionally or alternately, the sulfur content of the separated, hydrotreated effluent can be at least about 100 wppm, for example at least about 150 wppm, at least about 200 wppm, at least about 250 wppm, at least about 300 wppm, or at least about 400 wppm. The dewaxing stage can then be used to improve the cold flow properties of the separated, hydrotreated effluent while also reducing the sulfur content. The resulting effluent from the dewaxing stage, a diesel fuel product, can have a sulfur content of about 15 wppm or less, for example about 10 wppm or less or about 8 wppm or less. Optionally, the separation described above can be performed using a divided wall column separator. Alternately, the separation can be optional. In one embodiment without intermediate separation, the hydrotreating and dewaxing stages can be located in a single reactor.

One feature of some embodiments of the invention can include the ability for a dewaxing stage to effectively remove difficult sulfur compounds. Diesel feedstocks, which can include fractions in the 600° F.+ boiling range, can contain various types of sulfur species, including alkyl-substituted dibenzothiophenes. Without being bound by any particular theory, the HDS rate of hindered alkyl-substituted dibenzothiophenes is believed to be significantly slower in gas oils than dibenzothiophene or unhindered alkyl-substituted dibenzothiophenes. This can be due to a change in the HDS reaction pathway. Dibenzothiophenes and unhindered alkyl-substituted dibenzothiophenes are believed to be desulfurized via a direct C—S bond hydrogenolysis, similar to the situation for the thiophene sulfur removal mentioned above. By contrast, hindered dibenzothiophenes are believed to require a two-step pathway for sulfur removal that can include hydrogenation of an aromatic ring, followed by the C—S bond hydrogenolysis. At relatively low and moderate pressures, the hydrogenation step is believed to be the rate limiting step for hindered dibenzothiophene HDS.

It has been found that the rate of deep desulfurization for gas oils, and other feedstocks containing 600° F.+ boiling range compounds, can be improved by isomerizing hindered alkyl-substituted dibenzothiophenes to form unhindered dibenzothiophenes. This can facilitate the removal of sulfur, as the sulfur can be removed by the faster pathway of direct C—S bond hydrogenolysis without having to first hydrogenate an aromatic ring. Thus, isomerization of alkyl substituents on dibenzothiophenes in gas oils can allow for faster and more effective deep desulfurization of gas oils. Without being bound by any particular theory, in various embodiments, this isomerization can be performed along with desulfurization in a dewaxing stage.

Additionally or in alternate embodiments, a divided wall column can be employed as a fractionator as part of a two-stage unit. In such embodiments, the divided wall column can allow for lower cost production of diesel fuel with a sulfur content of about 15 wppm or less, for example about 10 wppm or less or about 8 wppm or less. In this type of embodiment, the hydrotreatment and dewaxing stages may share the same fractionator. The hydrotreatment stage can be used to reduce the sulfur content of a feedstock to a suitable level, such as a sulfur content of about 500 wppm or less, for example about 400 wppm or less or about 300 wppm or less. Additionally or alternately in this embodiment, the sulfur content of the effluent from the hydrotreatment stage can be at least about 100 wppm, for example at least about 150 wppm, at least about 200 wppm, at least about 250 wppm, at least about 300 wppm, or at least about 400 wppm. The effluent from the hydrotreatment stage can be delivered to a first volume of the divided wall column. The effluent delivered to this first volume can be fractionated into at least a heavier fraction and one or more lighter fractions. The heavier fraction can exit the fractionator from a location below the height of the dividing wall, while one, some, or all of the lighter fractions can exit the fractionator from the common portion of the fractionator above the dividing wall. The heavier fraction can be a bottoms fraction, or there can be multiple heavier fractions. In an embodiment, the heavier fractions from the first volume can include at least a bottoms fraction and a diesel fraction. At least a portion of one of the heavier fractions can be sent to the second reactor including a dewaxing stage. In still another embodiment, the sulfur content of the fraction sent to the second reactor can be about 500 wppm or less, for example about 400 wppm or less or about 300 wppm or less. In yet another embodiment, the sulfur content of the fraction sent to the second reactor can be at least about 100 wppm, for example at least about 150 wppm, at least about 200 wppm, at least about 250 wppm, at least about 300 wppm, or at least about 400 wppm. Optionally, portions of two or more heavier fractions can be sent to the second reactor. The effluent from the second reactor can then be passed to the second volume of the divided wall column to produce at least a diesel product fraction as a heavier fraction and one or more lighter fractions. Optionally, other heavier fractions can be produced in addition to the diesel product fraction, such as a bottoms fraction. The diesel product fraction can advantageously have a sulfur content of about 15 wppm or less, for example about 10 wppm or less or about 8 wppm or less. In this type of embodiment, the separate volumes of the divided wall column can enable production of a lower sulfur diesel product. Optionally, the second reactor can also include other stages, such as hydrotreatment, hydrocracking, and/or hydrofinishing stages. The effluent from the second reactor can be sent to the second volume of the divided wall column.

In still another type of embodiment, multiple reactors and a divided wall column can be used to produce varying grades of distillate and gas oil products at a reduced cost. In such an embodiment, the first reactor can include one or more hydrotreatment and/or hydrocracking stages, in order to provide a feed with a suitable sulfur content, such as a sulfur content of about 500 wppm or less, for example about 400 wppm or less or about 300 wppm or less. Additionally or alternately, the sulfur content of the effluent from the hydrotreatment stage can be at least about 100 wppm, for example at least about 150 wppm, at least about 200 wppm, at least about 250 wppm, at least about 300 wppm, or at least about 400 wppm. The effluent from this reactor can be sent to a first volume of a divided wall column for fractionation. The first volume of the fractionator can produce at least a diesel fraction, a bottoms fraction, and a lighter fraction which can exit the divided wall column from a common volume. The diesel fraction can advantageously be suitable for use as standard diesel fuel. At least a portion of the bottoms fraction can then be sent to a second reactor that includes a catalytic dewaxing stage. In an embodiment, the sulfur content of the fraction sent to the second reactor can be about 500 wppm or less, for example about 400 wppm or less or about 300 wppm or less. Additionally or alternately in this embodiment, the sulfur content of the fraction sent to the second reactor can be at least about 100 wppm, for example at least about 150 wppm, at least about 200 wppm, at least about 250 wppm, at least about 300 wppm, or at least about 400 wppm. Optionally, a portion of the diesel fraction can also be sent to the second reactor. This can result in production of at least an arctic diesel fraction, a bottoms fraction with improved cold flow properties, and a lighter fraction that can exit the divided wall column from a common volume. In this type of embodiment, the two reactors in combination with the divided wall column can produce at least four types of distillate products. The distillate products can include a diesel product; an arctic diesel product having improved cold flow properties relative to the diesel product; a vacuum gas oil product as the bottoms from the first fractionator volume, which could be suitable as an FCC feedstock; and a vacuum gas oil product with improved cold flow properties as the bottoms from the second fractionator volume, which could be suitable for further processing as a lube basestock.

Feedstocks

In an embodiment, a feedstock can have an initial boiling point of at least about 400° F. (about 204° C.), for example at least about 450° F. (232° C.), at least about 500° F. (about 260° C.), at least about 550° F. (about 288° C.), at least about 600° F. (about 316° C.), or at least about 650° F. (about 343° C.). In another embodiment, the feedstock can have a final boiling point of about 1200° F. (about 649° C.) or less, for example about 1100° F. (about 593° C.) or less, about 1050° F. (about 566° C.) or less, about 1000° F. (about 538° C.) or less, or about 900° F. (about 482° C.) or less. Additionally or alternately, the feedstock can be characterized by the boiling point required to boil a specified percentage of the feed. For example, the temperature required to boil at least 5 wt % of a feed is referred to as a "T5" boiling point. Preferably, the hydrocarbon feedstock can have a T5 boiling point at least about 400° F. (about 204° C.), for example at least about 450° F. (about 232° C.), at least about 500° F. (about 260° C.), at least about 550° F. (about 288° C.), at least about 600° F. (about 316° C.), at least about 650° F. (about 343° C.), or at least about 665° F. (about 352° C.). Additionally or alternately, the hydrocarbon feedstock can have a T95 boiling point of about 1150° F. (about 621° C.) or less, for example about 1100° F. (about 593° C.) or less, about 1050° F. (about 566° C.) or less, about 1000° F. (about 538° C.) or less, about 900° F. (about 482° C.) or less, or about 850° F. (about 454° C.) or less. Examples of suitable feeds can include, but are not necessarily limited to, various atmospheric and/or vacuum gas oil feeds, diesel boiling range feeds, and feeds corresponding to mixtures thereof.

In the discussion below, a "mineral oil" feedstock is meant to be a hydrocarbon-based oil from a fossil/mineral fuel source, such as crude oil, and not the commercial organic product, such as sold under CAS number 8020-83-5, e.g., by Aldrich.

In the discussion below, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus *Jatropha*. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to, rapeseed (canola) oil, soybean oil, coconut oil, sunflower oil, palm oil, palm kernel oil, peanut oil, linseed oil, tall oil, corn oil, castor oil, *jatropha* oil, jojoba oil, olive oil, flaxseed oil, camelina oil, safflower oil, babassu oil, tallow oil, and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat.

The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

The biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure substantially identical to the reaction product of glycerol and three fatty acids. Thus, although a triglyceride is described herein as being comprised of fatty acids, it should be understood that the fatty acid component does not necessarily contain a carboxylic acid hydrogen. In another embodiment, a majority of triglycerides present in the biocomponent feed can be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 500 wppm nitrogen, for example up to about 300 wppm nitrogen or up to about 100 wppm nitrogen. Instead of nitrogen and/or sulfur, the primary heteroatom component in biocomponent feeds is oxygen. Biocomponent diesel boiling range feedstreams, e.g., can include up to about 10 wt % oxygen, up to about 12 wt % oxygen, or up to about 14 wt % oxygen. Suitable biocomponent diesel boiling range feedstreams, prior to hydrotreatment, can include at least about 5 wt % oxygen, for example at least about 8 wt % oxygen.

A mineral hydrocarbon feedstock refers to a hydrocarbon feedstock derived from crude oil that has optionally but preferably been subjected to one or more separation and/or other refining processes. Preferably, the mineral hydrocarbon feedstock is or includes a petroleum feedstock boiling in the diesel range or above. Examples of suitable feedstocks can include, but are not limited to, virgin distillates, kerosene, diesel boiling range feeds, jet fuel, light cycle oils, atmospheric and/or vacuum gas oils, heavy cycle oils, and the like, and combinations thereof, including hydrotreated versions thereof.

Mineral hydrocarbon feedstreams suitable for use in various embodiments can have a nitrogen content from about 50 wppm to about 6000 wppm nitrogen, preferably from about 50 wppm to about 2000 wppm nitrogen, for example from about 75 wppm to about 1000 wppm nitrogen. Additionally or alternately, feedstreams suitable for use herein can have a sulfur content from about 100 wppm to about 40000 wppm sulfur, preferably from about 200 wppm to about 30000 wppm, for example from about 350 wppm to about 25000 wppm.

In various embodiments of the invention, the feed can also include feeds from biocomponent sources, for example at least 0.1 wt % based on a biocomponent source, such as at least 0.5 wt %, at least 1 wt %, at least 3 wt %, at least 10 wt %, or at least 15 wt %. Additionally or alternately in such embodiments, the feed can include 60 wt % or less based on a biocomponent source, for example 50 wt % or less, 40 wt % or less, or 30 wt % or less. In other embodiments, the amount of bio-coprocessing can be relatively small, with a feed that includes 20 wt % or less based on a biocomponent source, for example 15 wt % or less, 10 wt % or less, or 5 wt % or less. Additionally or alternately in such embodiments, the feed can include at least 0.5 wt % based on a biocomponent source, for example at least 1 wt %, at least 2.5 wt %, or at least 5 wt %.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

In some embodiments, diesel boiling range feedstreams suitable for use in the present invention tend to boil within the range of about 215° F. (about 102° C.) to about 800° F. (about 427° C.). In one preferred embodiment, the diesel boiling range feedstream can have an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Additionally or alternately in this preferred embodiment, the diesel boiling range feedstream can have a final boiling point of about 800° F. (about 427° C.) or less, or about 775° F. (about 413° C.) or less, or about 750° F. (about 399° C.) or less. In another embodiment, the diesel boiling range feedstream can have a boiling range from about 451° F. (about 233° C.) to about 800° C. (about 427° C.). Additionally or alternately, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F.

(about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Reaction System

In an embodiment, the reaction system can include one, some, or all of the following features. The feedstock can first be treated in a hydrotreatment reactor including one or more hydrotreatment stages or beds. The stages in the hydrotreatment reactor can be operated at a pressure below about 800 psig (about 5.5 MPag), or below about 700 psig (about 4.8 MPag). For example, the pressure in a stage in the hydrotreatment reactor can be at least about 300 psig (about 2.1 MPa), for example at least about 350 psig (2.4 MPag), at least about 400 psig (about 2.8 MPa), or at least about 450 psig (about 3.1 MPa). The pressure in a stage in the hydrotreatment reactor can be about 800 psig (about 5.5 MPag) or less, for example about 700 psig (about 4.8 MPag) or less, about 650 psig (about 4.5 MPag) or less, or about 600 psig (about 4.1 MPag) or less. Optionally, the hydrotreatment reactor can also include one or more other types of stages or beds, such as hydrocracking or hydrofinishing beds. The hydrotreatment stages (plus any other optional stages) can reduce the sulfur content of the feed to a suitable level. At such relatively low hydrotreatment pressures, it is typically not possible for the sulfur content in the hydrotreated product to be below about 100 wppm. Thus, for example, the sulfur content can be reduced sufficiently so that the feed into the dewaxing stage can have about 500 wppm sulfur or less, for example about 400 wppm or less, about 300 wppm to or less, or about 250 wppm or less, but typically also at least about 100 wppm of sulfur, for example at least about 150 wppm, or at least about 200 wppm.

The reaction conditions in a hydrotreatment stage can be conditions suitable for reducing the sulfur content of the feedstream. The reaction conditions can include an LHSV from about 0.3 hr$^{-1}$ to about 5.0 hr$^{-1}$, a total pressure from about 300 psig (about 2.1 MPag) to about 800 psig (about 5.5 MPag), a treat gas containing at least about 80% hydrogen (e.g., with the remainder comprising inert gas), and a temperature from about 500° F. (about 260° C.) to about 800° F. (about 427° C.). In one preferred embodiment, the reaction conditions can include an LHSV from about 0.5 to about 1.5 hr$^{-1}$, a total pressure from about 300 psig (about 2.1 MPag) to about 800 psig (about 5.5 MPag), for example from about 400 psig (about 2.8 MPag) to about 700 psig (about 4.8 MPag), and a temperature from about 700° F. (about 371° C.) to about 750° F. (about 399° C.).

The catalyst in a hydrotreatment stage can be a conventional hydrotreating catalyst, such as a catalyst composed of a Group VIB metal and/or a Group VIII metal on a support. Suitable metals can include, but are not limited to, cobalt, nickel, molybdenum, tungsten, or combinations thereof. Two preferred combinations of metals can include nickel and molybdenum (NiMo) or nickel, cobalt, and molybdenum (NiCoMo). Suitable supports can include, but are not limited to, silica, silica-alumina, alumina, titania, and combinations thereof.

In an embodiment, the amount of treat gas delivered to the hydrotreatment stage can be based on the consumption of hydrogen in the stage. The treat gas rate for a hydrotreatment stage can be from about two to about five times the amount of hydrogen consumed per barrel of fresh feed in the stage. A typical hydrotreatment stage can consume from about 50 scf/bbl (about 8.4 Nm$^3$/m$^3$) to about 1000 scf/bbl (about 170 Nm$^3$/m$^3$) of hydrogen, depending on various factors including the nature of the feed being hydrotreated. Thus, the treat gas rate can be from about 100 scf/bbl (about 17 Nm$^3$/m$^3$) to about 5000 scf/bbl (about 840 Nm$^3$/m$^3$). In one preferred embodiment, the treat gas rate can be from about two times to about five times the amount of hydrogen consumed, for example from about four times to about fives times. Note that the above treat gas rates refer to the rate of hydrogen flow. If hydrogen is delivered as part of a gas stream having less than 100% hydrogen, the treat gas rate for the overall gas stream can be proportionally higher.

The first reactor can also optionally include one or more hydrocracking stages. Non-limiting examples of hydrocracking catalysts include nickel, nickel-cobalt-molybdenum, cobalt-molybdenum, nickel-tungsten, nickel-molybdenum, and/or nickel-molybdenum-tungsten, the latter three which are preferred in one embodiment. Non-limiting examples of noble metal catalysts include those based on platinum and/or palladium. Porous support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment). Zeolitic supports, especially the large pore faujasites such as USY, can additionally or alternately be used. Suitable hydrocracking conditions can include, but are not limited to, a temperature from about 200° C. to about 450° C., a total pressure from about 300 psig (about 2.1 MPag) to about 800 psig (about 5.5 MPag), for example from about 400 psig (about 2.8 MPag) to about 700 psig (about 4.8 MPag), and a liquid hourly space velocity (LHSV) from about 0.05 h$^{-1}$ to about 10 h$^{-1}$. In another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In an embodiment, the amount of treat gas delivered to the hydrocracking stage can be based on the consumption of hydrogen in the stage. The treat gas rate for a hydrotreatment stage can be from about two times to about fifteen times the amount of hydrogen consumed per barrel of fresh feed in the stage. A typical hydrocracking stage can consume from about 50 scf/bbl (about 8.4 Nm$^3$/m$^3$) to about 1000 scf/bbl (about 170 Nm$^3$/m$^3$) of hydrogen, depending on various factors including the nature of the feed being hydrocracked. Thus, the treat gas rate can be from about 100 scf/bbl (about 17 Nm$^3$/m$^3$) to about 15000 SCF/B (about 2500 Nm$^3$/m$^3$). Preferably, the treat gas rate can be from about two times to about five times, for example from about four times to about five times, the amount of hydrogen consumed. Note that the above treat gas rates refer to the rate of hydrogen flow. If hydrogen is delivered as part of a gas stream having less than 100% hydrogen, the treat gas rate for the overall gas stream can be proportionally higher.

The effluent from the hydrotreatment reactor can optionally be passed into a separator. The separator can allow for separation of liquid effluent from contaminant gases formed during hydrotreatment, such as hydrogen sulfide or ammonia. Gas phase hydrocarbons (such as light ends) produced in the first reactor can also be removed. The separator can alternately be any other structure suitable for this type of gas/liquid separation, such as a fractionator. In embodiments where a separation stage is not included after the hydrotreatment stage or stages, the entire effluent from the hydrotreatment stages can be cascaded to the dewaxing stages without intermediate separation.

After the optional separation, at least a portion of the liquid effluent can be passed to a second reactor that includes at least one catalytic dewaxing stage. The second reactor can contain only dewaxing stages, or dewaxing stages and one or more optional hydrofinishing stages following the dewaxing stages. The second reactor can remove additional sulfur from the feed, as well as advantageously improving the cold flow properties of the feed.

Generally, catalytic dewaxing can be accomplished by selective hydrocracking or by isomerizing long chain molecules within a feed such as a diesel boiling range feed. Dewaxing catalysts are suitably molecular sieves such as crystalline aluminosilicates (zeolites) or silico-aluminophosphates (SAPOs). These catalysts may also carry a metal hydrogenation component, preferably including a Group VIII metal, especially a Group VIII noble metal. The amount of metal hydrogenation component can be from about 0.1 wt % to about 2.0 wt %, based on the weight of the dewaxing catalyst. In another preferred embodiment, the dewaxing catalyst can include nickel as a Group VIII metal, preferably in combination with tungsten, molybdenum, or a combination thereof. In such an embodiment, the amount of nickel can be from about 1 wt % to about 5 wt %. In other typical embodiments, the amount of nickel can be at least about 1 wt %, for example at least about 2 wt % or at least about 2.5 wt %. Additionally or alternately, the amount of nickel can be about 5 wt % or less, for example about 4 wt % or less. The amount of Group VI metal (tungsten, molybdenum, or combination of tungsten and molybdenum), when present, can be from about 5 wt % to about 20 wt %. In other typical embodiments, the amount of Group VI metal can be at least about 5 wt %, for example at least about 8 wt % or at least about 10 wt %. Additionally or alternately, the amount of Group VI metal can be about 20 wt % or less, for example about 15 wt % or less. Dewaxing conditions can include, but are not necessarily limited to, a temperature from about 280° C. to about 380° C., a total pressure from about 300 psig (about 2.1 MPag) to about 800 psig (about 5.5 MPag), for example from about 400 psig (about 2.8 MPag) to about 700 psig (about 4.8 MPag), and an LHSV from about 0.1 hr$^{-1}$ to about 5.0 hr$^{-1}$. In another embodiment, the pressure for the dewaxing conditions can be the same as the pressure for the hydrotreating conditions. In yet another embodiment, the temperature for the dewaxing conditions can be the same as the temperature for the hydrotreating conditions.

In various embodiments, the molecular sieve used for catalytic dewaxing can comprise, consist essentially of, or be ZSM-48. ZSM-48 is a 10-member ring 1-D molecular sieve. Without being bound by theory, ZSM-48 is believed to perform dewaxing primarily by isomerizing molecules within the feed. Typical silica to alumina ratios for the ZSM-48 can be about 250:1 or less, for example about 200:1 or less, preferably less than about 110:1. To form a catalyst, the ZSM-48 can be composited with a binder. Suitable binders can include, but are not limited to, silica, alumina, silica-alumina, titania, zirconia, and mixtures thereof. Other suitable binders will be apparent to those of skill in the art.

In an embodiment, the amount of treat gas delivered to the catalytic dewaxing stage can be based on the consumption of hydrogen in the stage. The treat gas rate for a dewaxing stage can be from about two times to about fifteen times the amount of hydrogen consumed per barrel of fresh feed in the stage. A typical catalytic dewaxing stage can consume from about 50 scf/bbl (about 8.4 Nm$^3$/m$^3$) to about 200 scf/bbl (about 34 Nm$^3$/m$^3$) of hydrogen, depending on various factors including the nature of the feed being dewaxed. Thus, the treat gas rate can be from about 100 scf/bbl (about 17 Nm$^3$/m$^3$) to about 3000 scf/bbl (about 510 Nm$^3$/m$^3$). In one preferred embodiment, the treat gas rate can be from about two times to about five times, for example from about four times to about five times, the amount of hydrogen consumed. Note that the above treat gas rates refer to the rate of hydrogen flow. If hydrogen is delivered as part of a gas stream having less than 100% hydrogen, the treat gas rate for the overall gas stream can be proportionally higher.

Hydrofinishing catalysts can include catalysts containing Group VIB metals, Group VIII metals, and mixtures thereof. In an embodiment, the hydrofinishing catalyst can include at least one metal sulfide having a strong hydrogenation function. In another embodiment, the hydrofinishing catalyst can include a Group VIII noble metal, such as Pt and/or Pd. A mixture of metals may also be present as bulk metal catalysts, wherein the amount of metal can be about 30 wt % or greater, based on catalyst weight. Suitable refractory (metal oxide) supports can include low acidic oxides such as silica, alumina, silica-aluminas, and/or titania. The preferred hydrofinishing catalysts for aromatic saturation can comprise at least one metal having relatively strong hydrogenation function on a porous support. Typical support materials can include amorphous or crystalline oxide materials such as alumina, silica, and silica-alumina. The support materials may also be modified, such as by halogenation, or in particular fluorination. The non-noble metal content of the catalyst can often be as high as about 20 wt %. In an embodiment, a preferred hydrofinishing catalyst can include a crystalline material belonging to the M41S class or family of catalysts, which are mesoporous materials having relatively high silica content. Examples can include MCM-41, MCM-48, and MCM-50. A preferred member of this class is MCM-41.

Hydrofinishing conditions can include a temperature from about 125° C. to about 425° C., for example from about 180° C. to about 280° C., a total pressure from about 300 psig (about 2.1 MPag) to about 800 psig (about 5.5 MPag), for example from about 400 psig (about 2.8 MPag) to about 700 psig (about 4.8 MPag), and an LHSV from about 0.1 hr$^{-1}$ to about 5 hr$^{-1}$, for example from about 0.5 hr$^{-1}$ to about 1.5 h$^{-1}$. The treat gas rate can be selected in accordance with the procedure described above for a hydrotreatment stage.

At least the liquid effluent from the second reactor can then be passed into a fractionator. The fractionator can allow for fractionation of the effluent to form at least a diesel fraction with beneficial cold flow properties, such as a winter or arctic diesel. Such a diesel fraction can have a cloud point of about −15° C. or less, for example about −20° C. or less, about −30° C. or less, or about −40° C. or less.

Divided Wall Column as a Fractionator

In various embodiments, a divided wall column can be employed as a fractionation tower. The divided wall column can contain at least three separate volumes. One of the volumes is a common volume toward the top of the divided wall column. The remaining volumes in the divided wall column represent volumes separated from each other by a dividing wall. The various volumes are all in fluid communication via the common volume. However, petroleum fractions with a sufficiently high boiling point should not travel up the column to a sufficient height to reach the common volume.

In various embodiments below, the divided wall column is described as having one common volume and two separated volumes. However, a divided wall column could also have three or more separated volumes, along with the one common volume.

The volumes can be arranged in any configuration that is convenient for the desired fractionations. One option is to have each of the separated volumes occupy roughly equal portions of the divided section. For example, a divided wall column with two separated area and one common area above could have each of the separated areas occupy approximately half of the lower portion of the divided wall column. Similarly, a divided wall column with three separated areas could have each separated area occupy approximately a third of the lower portion. Alternately, each of the separated areas can have different volumes.

In various embodiments, the position of the dividing wall can be any convenient position that leads to the appropriate volumes for the separated areas. For a divided wall column having a roughly cylindrical shape, one option is to have a dividing wall with a cross section that corresponds roughly to a diameter of the column. This would produce two separated areas with roughly equal volumes. Another option is to have a dividing wall that corresponds to a chord connecting two points on the circumference of the round shape, thus leading to different volumes for each separated area. Still another option would be to have a dividing wall that creates concentric circular volumes for the separated portions. While it is believed that roughly cylindrical shapes may be preferred for the external shell of divided wall columns, the above placements for a dividing wall can be equally applied to columns having other geometric shapes.

In an embodiment, the dividing wall can have a height that is tall enough to allow for removal of two or more fractions from one of the separated volumes within the column. This means that at least two fractions that do not mix with the common volume can be removed from a separated area. For example, a separated volume could be used to produce both a vacuum gas oil bottoms stream and a diesel stream withdrawn from the separated volume at a location below the height of the dividing wall. Preferably, the dividing wall has a height that is sufficient to allow for removal of two or more fractions from each of the separated volumes.

Additionally or alternatively, the height of the dividing wall can be selected based on controlling the amount of contamination between the multiple product fractions produced by the column. For example, in a divided wall column that produces diesel fractions, the separated volumes can be used to produce two diesel fractions of different quality, such as one diesel fraction with a higher amount of sulfur and a second diesel fraction that satisfies a more stringent specification. In such an example, it can be desirable to limit the amount of exchange that occurs between the two diesel fractions. To limit such exchange, the height of the dividing wall can be selected to limit the amount "contamination" between the fractions. In an embodiment, the dividing wall can have a sufficient height so that less than about 10 wt % of the product from a first separated volume corresponds to substances from a second separated volume, for example less than about 5 wt %, less than about 1 wt %, less than about 0.1 wt %, or less than about 0.05 wt %. The amount of contamination that is allowed can be dependent on the nature of the product. For example, if contamination can cause a product to fall outside of a government mandated specification or other requirement, the dividing wall height can be selected to limit contamination to a more stringent level such as less than about 0.1 wt % or less than about 0.05 wt %. Alternately, if the desire to reduce contamination is due merely to decrease in product value with a decrease in purity, the height of the dividing wall could be balanced versus other economic considerations. In an embodiment, simulations and/or model compound experiments can be used to determine an appropriate dividing wall height.

Additionally or alternatively, the height of the dividing wall can be selected based on the location of a condensing zone in the column. For a given product produced by a distillation column, the condensing zone or stage for the product can represent an upper limit for the expected height of travel for vapor of the given product. For the example of preventing contamination between diesel fractions, selecting a dividing wall height corresponding to the condensing zone for a diesel fraction would be expected to limit contamination to about 1 wt % or less, for example about 0.5 wt % or less, about 0.1 wt % or less, or about 0.05 wt % or less.

Additionally or alternatively, the height of the dividing wall can be selected in relation to one or more features of the divided wall column. For example, the height of the dividing wall can be selected to correspond to about the height between the bottom of the column and the height of the flash zone. In another embodiment, the height of the dividing wall can correspond to the height of the bottom section of trays in the column.

In yet another embodiment, the height of the dividing wall can be at least about 15% of the height of the divided wall column, for example at least about 25% or at least about 30%. Additionally or alternatively, the height of the dividing wall can be about 70% or less of the height of the divided wall column, for example about 60% or less, about 50% or less, about 40% or less, or about 30% or less. In absolute measurements, the height of the divided wall column can be about 25 meters or less, for example about 35 meters or less, about 50 meters or less, about 75 meters or less, or about 100 meters or less.

The diameter of a divided wall column can be selected so that the cross-sectional areas of the separate volumes roughly correspond to the cross-sectional areas of the individual fractionation columns that are being replaced. In an embodiment, the cross-sectional areas of the separate volumes can be within about 10% (or less) of the cross-sectional areas of the individual fractionation columns being replaced, for example within about 5% (or less).

In an embodiment, the interior of the divided wall column can include typical components of a fractionator. For example, a series of trays can be located in the divided wall column to assist with fractionation. Some of the trays can be located in the common volume. Other trays can be located in the separate volumes. The tray locations and/or spacing in the separate volumes can be the same or different in each volume. As an alternative to trays, any other type of internal structure typically found in a fractionator can be used, such as random packings, structured packings, grids, liquid distributors, vapor distributors, liquid collectors, vapor collectors, and the like, and combinations thereof. The divided wall column can also include other typical fractionator parts, such as a flash zone or a sump.

In an embodiment, a divided wall column can be employed in place of the separator and the fractionator. One example of a suitable reaction system can include two reactors and a divided wall column. In such an embodiment, a feedstock can be passed into a first reactor. The first reactor can include one or more stages for hydrotreatment, hydrocracking, or another type of conversion process.

The effluent from the first reactor can then be passed to a divided wall column. The effluent can enter the divided wall column in a first separated volume. The divided wall column can fractionate the first effluent into a bottoms portion, another portion that leaves the divided wall column from the separated volume, and a lighter portion that enters a common volume in the divided wall column. In an embodiment where the bottoms portion corresponds to a feed that boils in the vacuum gas oil range, such as a bottoms portion suitable for use as a feed to a fluid catalytic cracking process, the additional portion that leaves the divided wall column from the separated volume can be a diesel fraction. More generally, the additional portion that leaves the divided wall column from the separated volume can be any distinct cut that has a lower boiling point than the bottoms but a higher boiling point than a portion that enters the common volume. Thus, the additional portion could alternatively be a diesel cut, an arctic diesel cut, a kerosene cut, a heavy naphtha cut, a light gas oil cut, or the like, depending on the nature of the bottoms.

At least a portion of the bottoms from the first (separated) volume of the divided wall column can then be passed to a second reactor. Optionally, at least a portion of any additional cuts that exit from the first volume can also be passed to the second reactor. The second reactor can include one or more stages for performing hydrotreatment, hydrocracking, catalytic isomerization or dewaxing, hydrofinishing, or another desired type of hydroprocessing. Preferably, the second reactor can include one or more catalytic dewaxing stages, optionally followed by one or more hydrofinishing stages. The second reactor can advantageously further reduce the sulfur content while improving the cold flow properties of the resulting diesel product.

The effluent from the second reactor can then be passed to a second separated volume in the divided wall column for fractionation. The second volume can fractionate the effluent from the second reactor into at least a bottoms portion, another portion that exits from the second volume, and a portion that enters the common volume. In an embodiment, all portions of fractionated effluents that enter the common volume can be fractionated into one or more products, such as a kerosene cut, one or more types of naphtha cuts, or light ends. Preferably, the bottoms cut and/or additional portion exiting from the second volume are not recycled to the first reactor or second reactor. These cuts may undergo further processing, however.

Additional/Alternate Embodiments

Additionally or alternatively, the present invention can include the following embodiments.

Embodiment 1

A method for producing low sulfur distillate products, comprising: hydrotreating a feedstock having a sulfur content of at least about 1500 wppm under effective hydrotreating conditions to produce at least a liquid fraction; separating the liquid fraction from a gas phase fraction, the separated liquid fraction having a sulfur content of at least about 100 wppm; hydroprocessing at least a portion of the separated liquid fraction under effective dewaxing conditions in the presence of a catalyst including at least one Group VIII metal on a bound zeolite, the bound zeolite comprising a one-dimensional 10-member ring zeolite; and fractionating the hydroprocessed liquid fraction to is produce at least a product fraction, the product fraction having a sulfur content of about 15 wppm or less, a nitrogen content of about 5 wppm or less, and a cloud point of about −15° C. or less.

Embodiment 2

A method for producing low sulfur distillate products, comprising: hydrotreating a feedstock having a sulfur content of at least about 1500 wppm under effective hydrotreating conditions; fractionating the hydrotreated feedstock in a first volume of a divided wall column fractionator to produce at least a liquid fraction and a first common fraction that is passed to an upper undivided volume of the fractionator, the liquid fraction having a sulfur content from about 200 wppm to about 500 wppm; hydroprocessing at least a portion of the liquid fraction under effective dewaxing conditions in the presence of a catalyst including at least one Group VIII metal on a bound zeolite, the bound zeolite comprising a one-dimensional 10-member ring zeolite; and fractionating the hydroprocessed liquid fraction in a second volume of the divided wall column fractionator to produce at least a product fraction and a second common fraction that is passed to the upper undivided volume of the fractionator, the product fraction having a sulfur content of about 15 wppm or less, a nitrogen content of about 5 wppm or less, and a cloud point of about −15° C. or less.

Embodiment 3

The method of embodiment 2, wherein the height of the dividing wall is selected so that the second product fraction contains about 1 wt % or less of material corresponding to the first product fraction.

Embodiment 4

The method of any one of the previous embodiments, wherein the sulfur content of the separated liquid fraction is about 500 wppm or less, and wherein the at least one Group VIII metal on the bound zeolite comprises Pt and/or Pd.

Embodiment 5

The method of embodiment 4, wherein the Group VIII metal is Pt, and the amount of Group VIII metal on the bound zeolite is from about 0.1 wt % to about 1.5 wt %.

Embodiment 6

A method for producing low sulfur distillate products, comprising: hydrotreating a feedstock having a sulfur content of at least about 1500 wppm under effective hydrotreating conditions to produce at least a liquid fraction; hydroprocessing at least a portion of the liquid fraction, the at least a portion of the liquid fraction having a sulfur content of at least about 100 wppm, under effective dewaxing conditions in the presence of a catalyst including at least one Group VIII metal on a bound zeolite, the bound zeolite comprising a one-dimensional 10-member ring zeolite, the at least one Group VIII metal comprising Ni; and fractionating the hydroprocessed liquid fraction to produce at least a product fraction, the product fraction having a sulfur content of about 15 wppm or less, a nitrogen content of about 5 wppm or less, and a cloud point of about −15° C. or less.

Embodiment 7

A method according to embodiment 6, wherein the dewaxing catalyst further comprises a Group VI metal, the Group VI metal being W, Mo, or a combination thereof.

Embodiment 8

A method according to embodiment 7, wherein the amount of Ni is from about 1 wt % to about 5 wt %, and the amount of Group VI metal is from about 5 wt % to about 20 wt %.

Embodiment 9

A method according to any one of embodiments 6-8, wherein the at least a portion of the liquid fraction is cascaded from the hydrotreating to the hydroprocessing without intermediate separation.

Embodiment 10

The method of any one of the previous embodiments, wherein the effective hydrotreating conditions comprise a pressure from about 300 psig (about 2.1 MPag) to about 800 psig (about 5.5 MPag), a temperature from about 500° F. (about 260° C.) to about 800° F. (about 427° C.), and a space velocity from about 0.3 hr$^{-1}$ to about 5.0 hr$^{-1}$.

Embodiment 11

The method of any one of the previous embodiments, wherein the effective hydrotreating conditions include a treat gas rate that provides an amount of hydrogen from about two times to about five times the hydrogen consumed during the hydrotreating.

Embodiment 12

The method of any one of the previous embodiments, wherein the effective dewaxing conditions include a temperature from about 280° C. to about 380° C., a pressure from about 300 psig (about 2.1 MPag) to about 800 psig (about 5.5 MPag), an LHSV from about 0.5 hr$^{-1}$ to about 5.0 hr$^{-1}$, and a hydrogen treat gas rate of from about two times to about fifteen times the hydrogen consumed during the dewaxing.

Embodiment 13

The method of any one of the previous embodiments, further comprising hydrofinishing the dewaxed liquid fraction under effective hydrofinishing conditions prior to fractionating the dewaxed liquid fraction, the effective hydrofinishing conditions including a temperature from about 180° C. to about 280° C., a total pressure from about 300 psig (about 2.1 MPag) to about 800 psig (5.5 MPag), an LHSV from about 0.1 hr$^{-1}$ to about 5 hr$^{-1}$, and a hydrogen treat gas rate of from about two times to about five times the hydrogen consumed during the hydrofinishing.

EXAMPLES

Example 1

Configuration for Production of Varying Cold Flow Properties

In an embodiment, a divided wall column can be used as a fractionator in a two reactor reaction system for producing multiple grades of diesel as well as multiple grades of bottoms products. FIG. 1 schematically shows an example of this type of system. Note that the functions of the divided wall column shown in FIG. 1 could alternatively be performed by having a separator/fractionator dedicated to each of the reactors shown in FIG. 1. In still another option, the entire effluent from a reactor can be cascaded to the next reactor, thus eliminating the need for a separation stage between reactors.

In the embodiment shown in FIG. 1, reactor 110 includes one or more stages for hydrotreatment of a feed. Optionally, reactor 110 can also include one or more hydrocracking and/or hydrofinishing stages. FIG. 1 shows a reactor 110 that includes two hydrotreatment stages 112 and 114. However, any other convenient combination of stages can be included in reactor 110. Note that FIG. 1 shows a reactor 110 including multiple stages. In another embodiment, multiple reactors in series can be used in place of a single reactor with multiple stages.

In a hydrotreatment stage, a feed 105 is exposed to a hydrotreatment catalyst under effective hydrotreatment conditions. The catalyst in a hydrotreatment stage can be a conventional hydrotreating catalyst, such as a catalyst composed of a Group VIB metal and/or a Group VIII metal on a support. Suitable metals can include cobalt, nickel, molybdenum, tungsten, or combinations thereof. In one preferred embodiment, the combinations of metals can include nickel and molybdenum (NiMo) or nickel, cobalt, and molybdenum (NiCoMo). Suitable supports can include, but are not limited to, silica, silica-alumina, alumina, titania, and combinations thereof.

The effluent 125 from reactor 110 can then be passed to a first volume 132 of divided wall column 130. The effluent 125 can be fractionated into at least a lighter portion that can travel up into common portion 136 and a cut that can eventually become a diesel fuel after the catalytic dewaxing stage(s) in the second reactor. The embodiment shown in FIG. 1 shows at least three cuts being produced. In the first volume 132, a bottoms cut 142 and a diesel cut 144 can be produced. Lighter portions of effluent 125 can travel up in the divided wall column to enter common portion 136. In the embodiment shown in FIG. 1, common portion 136 can also separate out one or more additional cuts, such as kerosene cut 143 and/or a naphtha cut 145.

At least a portion of bottoms cut 142 and/or diesel cut 144 can then be passed to a second reactor 150. In the embodiment shown in FIG. 1, second reactor 150 can include a catalytic dewaxing stage 152 and a hydrofinishing stage 154. Alternately, second reactor 150 can include one or more catalytic dewaxing stages and/or hydrofinishing stages. Preferably, second reactor 150 can include one or more catalytic dewaxing stages optionally followed by one or more hydrofinishing stages.

In a catalytic dewaxing stage, such as stage 152, a feed can be exposed to a catalytic dewaxing catalyst under catalytic dewaxing conditions. Generally, catalytic dewaxing can be accomplished by selective hydrocracking or by isomerizing long chain molecules within a feed such as a diesel boiling range feed. Dewaxing catalysts can also suitably comprise, consist essentially of, or be molecular sieves such as crystalline aluminosilicates (zeolites) or silico-aluminophosphates (SAPOs). These catalysts may also carry a metal hydrogenation component, preferably containing one or more Group VIII metals. In one preferred embodiment, the metal hydrogenation component can comprise a Group VIII noble metal, such as Pt and/or Pd. In another preferred embodiment, the dewaxing catalyst can include Ni as a Group VIII metal in combination with one or more Group VIB metals such as W and/or Mo.

In various embodiments, the molecular sieve used for catalytic dewaxing can comprise, consist essentially of, or be ZSM-48. ZSM-48 is a 10-member ring 1-D molecular sieve. Without being bound by theory, ZSM-48 is believed to perform dewaxing primarily by isomerizing molecules within the feed. Typical silica to alumina ratios for the ZSM-48 can be about 250:1 or less, for example about 200:1 or less, preferably less than about 110:1. To form a catalyst, the ZSM-48 can be composited with a binder. Suitable binders can include, but are not limited to, silica, alumina, silica-alumina, titania, zirconia, and mixtures thereof. Other suitable binders will be apparent to those of skill in the art.

In the embodiment shown in FIG. 1, the output from catalytic dewaxing stage 152 can then be passed to optional hydrofinishing stage 154. Hydrofinishing catalysts can include catalysts containing Group VIB metals, Group VIII metals, and mixtures thereof. In an embodiment, the hydrofinishing catalyst can include at least one metal sulfide having a strong hydrogenation function. In another embodiment, the hydrofinishing catalyst can include a Group VIII noble metal, such as Pt and/or Pd. A mixture of metals may also be present as bulk metal catalysts, wherein the amount of metal can be about 30 wt % or greater, based on catalyst weight. Suitable refractory (metal oxide) supports can include low acidic oxides such as silica, alumina, silica-aluminas, and/or titania. The preferred hydrofinishing catalysts for aromatic saturation can comprise at least one metal having relatively strong hydrogenation function on a porous support. Typical support materials can include amorphous or crystalline oxide materials such as alumina, silica, and silica-alumina. The support materials may also be modified, such as by halogenation, or in particular fluorination. The non-noble metal content of the catalyst can often be as high as about 20 wt %. In an embodiment, a preferred hydrofinishing catalyst can include a crystalline material belonging to the M41S class or family of catalysts, which are mesoporous materials having relatively high silica content. Examples can include MCM-41, MCM-48, and MCM-50. A preferred member of this class is MCM-41.

The effluent 165 from the second reactor 150 can then be passed to a second volume 134 of the divided wall column 130. The divided wall column 130 can fractionate the effluent 165 into at least a bottoms fraction 172, an arctic diesel fraction 174, and lighter portions which can travel up to common volume 136. The bottoms fraction 172 can include dewaxed vacuum gas oil suitable as a feed to another process, such as a feed for production of lubricant base stocks. The arctic diesel fraction 174 can advantageously be suitable for use as a diesel fuel in relatively low temperature environments, or alternately portions of arctic diesel fraction 174 can be blended with portions of diesel fraction 134.

In an embodiment such as FIG. 1, at least two different grades of product can be optionally produced by each separate volume of a divided wall column. For example, in the embodiment shown in FIG. 1, each separate volume of a divided wall column can produce a diesel fuel. The difference between a fraction a from a first separate volume and a second separate volume can be based on a different sulfur content for the products, a different nitrogen content, a different boiling point or distillation profile, or another feature such as a cold flow property of the fraction. With regard to cold flow properties, a fraction from a first separate volume can differ from a fraction from a second separate volume based on a cloud point, a pour point, or another cold flow property. It is noted, however, that multiple grades of product do not have to be produced by any of the separate volumes. Each separate volume can be configured to produce various desired cuts, which can be as few as having one heavy or bottoms cut and a portion that travels up the divided wall column to the common volume.

In an embodiment, the cloud point of fraction from a second separate volume can be at least about 5° C. less than the cloud point of a fraction from a is first separate volume, for example at least about 10° C. less, at least about 15° C. less, at least about 20° C. less, or at least about 25° C. less. Additionally or alternately, the pour point of fraction from a second separate volume can be at least about 5° C. less than the pour point of a fraction from a first separate volume, for example at least about 10° C. less, at least about 15° C. less, at least about 20° C. less, or at least about 25° C. less.

If the diesel fractions differ due to differences in sulfur and/or nitrogen content, a diesel fraction from a first separate volume can have a sulfur and/or nitrogen content greater than the sulfur and/or nitrogen content of a diesel fraction from a second separate volume. For instance, the sulfur content of a diesel fraction from a first separate volume can be at least about 15 wppm, for example at least about 25 wppm, at least about 50 wppm, at least about 100 wppm, or at least about 250 wppm. Additionally or alternately, the sulfur content of the diesel fraction from a first separate volume can also be about 400 wppm or less, for example about 200 wppm or less, about 100 wppm or less, or about 50 wppm or less. In this embodiment, the sulfur content of a diesel fraction from a second separate volume can be about 50 wppm or less, for example about 25 wppm or less, about 15 wppm or less, about 10 wppm or less, or about 8 wppm or less.

With regard to distillation profile, the separate volumes in a divided wall column can be configured to produce diesel boiling range cuts with a T5 boiling point of at least about 215° F. (about 102° C.), for example at least about 250° F. (about 121° C.), at least about 350° F. (about 177° C.), at least about 450° F. (about 232° C.), or at least about 500° F. (about 260° C.). Additionally or alternately, the T95 boiling point can be about 800° F. (about 427° C.) or less, for example about 700° F. (about 371° C.) or less, about 600° F. (about 316° C.) or less, about 550° F. (about 288° C.) or less, about 500° F. or less (about 260° C.), or about 450° F. or less (about 232° C.). Note that if more than one diesel boiling range stream is produced in a separate volume, the above T5 and T95 values can be used to characterize any or each of the streams.

In an embodiment, the difference in T5 boiling point for a diesel boiling range stream from a first separate volume relative to a second separate volume can be at least about 5° C., for example at least about 10° C., at least about 25° C., or at least about 50° C. Additionally or alternately, the difference in T95 boiling point for a diesel boiling range stream from a first separate volume relative to a second separate volume can be at least about 5° C., for example at least about 10° C., at least about 25° C., or at least about 50° C.

Each separate volume can also produce at least one higher boiling range stream, such as a higher boiling diesel boiling range stream or a gas oil boiling range stream. The bottoms from a separate volume can be the higher boiling range stream, but in some embodiments multiple diesel boiling range and/or gas oil boiling range streams can be produced from each separate volume. The bottoms stream (or other additional diesel or higher boiling range streams) from each separate volume can differ based on sulfur content, nitrogen content, distillation profile, or another feature.

If the bottoms fractions (or other additional fractions) differ due to differences in sulfur content, a bottoms fraction from a first separate volume can have a sulfur content greater than the sulfur content of a bottoms fraction from a second separate volume. The sulfur content of a bottoms fraction from a first separate volume can be at least about 15 wppm, for example at least about 25 wppm, at least about 50 wppm, at least about 100 wppm, at least about 200 wppm, at least about 250 wppm, or at least about 500 wppm. Additionally or alternately, the sulfur content of bottoms fraction from a first separate volume can be about 500 wppm or less, for example about 400 wppm or less, about 300 wppm or less, about 250 wppm or less, or about 200 wppm or less. In this embodiment, the sulfur content of a bottoms fraction from a second separate volume can be about 100 wppm or less, for example about 50 wppm or less, about 20 wppm or less, or about 10 wppm or less.

With regard to distillation profile, the separate volumes in a divided wall column can be configured to produce gas oil boiling range cuts with a T5 boiling point of at least about 550° F. (about 288° C.), for example at least about 600° F. (about 316° C.), at least about 700° F. (about 371° C.), or at least about 800° F. (about 427° C.). Additionally or alternately, the T95 boiling point can be about 1100° F. (about 593° C.) or less, for example about 1000° F. (about 538° C.) or less, about 900° F. (about 482° C.) or less, or about 800° F. (about 427° C.) or less.

In an embodiment, the difference in T5 boiling point for a gas oil boiling range stream from a first separate volume relative to a second separate volume can be at least about 5° C., for example at least about 10° C., at least about 25° C., or at least about 50° C. Additionally or alternately, the difference in T95 boiling point for a gas oil boiling range stream from a first separate volume relative to a second separate volume can be at least about 5° C., for example at least about 10° C., at least about 25° C., at least about 50° C., or at least about 100° C.

The common volume of the divided wall column can also produce one or more streams. The one or more streams that exit the divided wall column from the common volume can include a naphtha boiling range stream, a kerosene boiling range stream, a light ends stream of $C_4$-hydrocarbons, or a combination thereof. A separate stream of hydrogen, hydrogen sulfide, ammonia, and/or other non-condensable gases can also be produced, or these components can leave the common volume as part of another stream such as a light ends stream. When present, a kerosene boiling range stream can have a T5 boiling point of at least about 200° F. (about 93° C.), for example at least about 215° F. (about 102° C.) or at least about 250° F. (about 121° C.). Additionally or alternately, the kerosene boiling range stream can have a T95 boiling point of about 450° F. (about 232° C.) or less, for example about 400° F. (about 204° C.) or less or about 350° F. (about 177° C.) or less. When present, a naphtha boiling range stream can have a T5 boiling point of at least about 85° F. (about 29° C.), for example at least about 100° F. (about 38° C.) or at least about 120° F. (about 49° C.). Additionally or alternately, the naphtha boiling range stream can have a T95 boiling point of about 250° F. (about 121° C.) or less, for example about 215° F. (about 102° C.) or less or about 200° F. (about 93° C.) or less.

Example 2

Example of Suitable Divided Wall Column

Based on simulations, the following divided wall column is predicted to be suitable for various embodiments of the invention. In this embodiment, a divided wall column having a height of about 35 meters was simulated. Table 1 provides further information regarding the details of the divided wall column.

TABLE 1

| Section | Tray nos. | Tray passes | Tray spacing (mm) | Tray efficiency | Section height (m) |
|---|---|---|---|---|---|
| 1 | 2-6 | 1 | 610 | 75% | 4.3 |
| 2 | 7-18 | 2 | 508 | 65% | 9.4 |
| 3 | 19-26 | 2 | 838 | 65% | 10.3 |
| Flash zone | | | | | 3.0 |
| 4 | 27-30 | 2 | 610 | 50% | 4.9 |
| Sump | | | | | 3.0 |

The divided wall column described in Table 1 was simulated for fractionation of the output of a configuration similar to the reactors shown in Example 1. The dividing wall for the divided wall column in Table 1 can be at least as tall as about the height of the sump plus zone 4, and less than about the total height of the sump, section 4, and the flash zone. Thus, for the dividing wall column shown in Table 1, the dividing wall can be from about 7.9 m to about 10.9 m. Additionally or alternately, the height of the dividing wall can be selected so that any contamination between fractions produced in different separate volumes can be below a desired level.

In the simulations for the divided wall column, the dividing wall resulted in two different sized volumes. The first separate volume, corresponding to the separate volume for the hydrotreating/hydrocracking product represented about 59% of the total volume. The two separate volumes for the divided wall column were selected to have volumes that were roughly similar to individual fractionation columns suitable for the same separation.

The divided wall column described in Table 1 allowed for fractionation of two distinct products from each of the separate areas below the height of the dividing wall. For an initial vacuum gas oil feed, the separate products included a bottoms product and a diesel boiling range product. The bottoms product and diesel boiling range product from the second separate volume of the divided wall column corresponded to products with improved cold flow properties relative to the products from the first separate volume.

Example 3

Desulfurization Under Dewaxing Conditions

Figure 2:
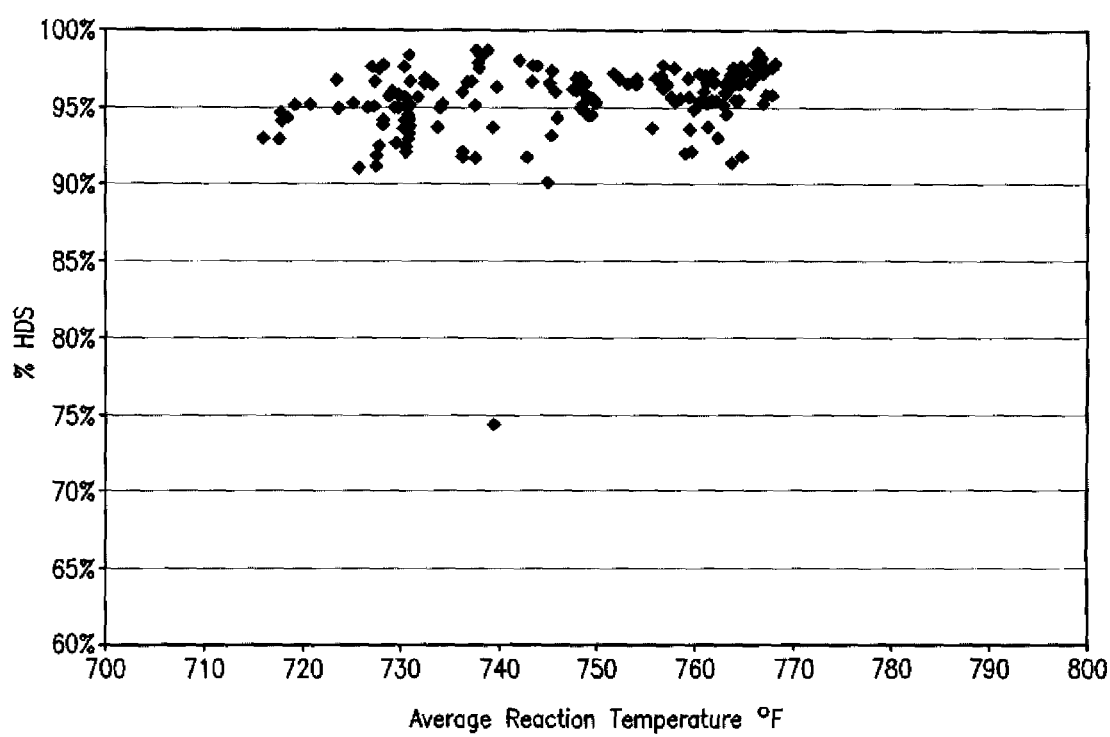
FIG. 2 shows results for sulfur removal from a feed under catalytic dewaxing conditions.

FIG. 2 shows results for treatment of a sulfur-containing feed under catalytic dewaxing conditions. For the data in FIG. 2, the feed was a diesel boiling range waxy feed that included about 643 wppm of sulfur and about 149 wppm of nitrogen. The feed was exposed to dewaxing catalyst under catalytic dewaxing conditions including a temperature between about 710° F. (about 377° C.) and about 770° F. (about 410° C.) and an LHSV of about 2.3 $hr^{-1}$. The $H_2$ pressure during dewaxing was about 765 psig (about 5.3 MPag). The dewaxing catalyst was alumina-bound ZSM-48 with a silica to alumina ratio of about 200:1 that included about 0.6 wt % of Pt as a metal hydrogenation component. As shown in FIG. 2, between about 90% and about 99% of the sulfur was removed in the dewaxing step over the range of temperatures studied. FIG. 2 shows that catalytic dewaxing conditions can be used to effectively perform sulfur removal.

Example 4

Desulfurization of Sour Feed Under Dewaxing Conditions

Figure 3:
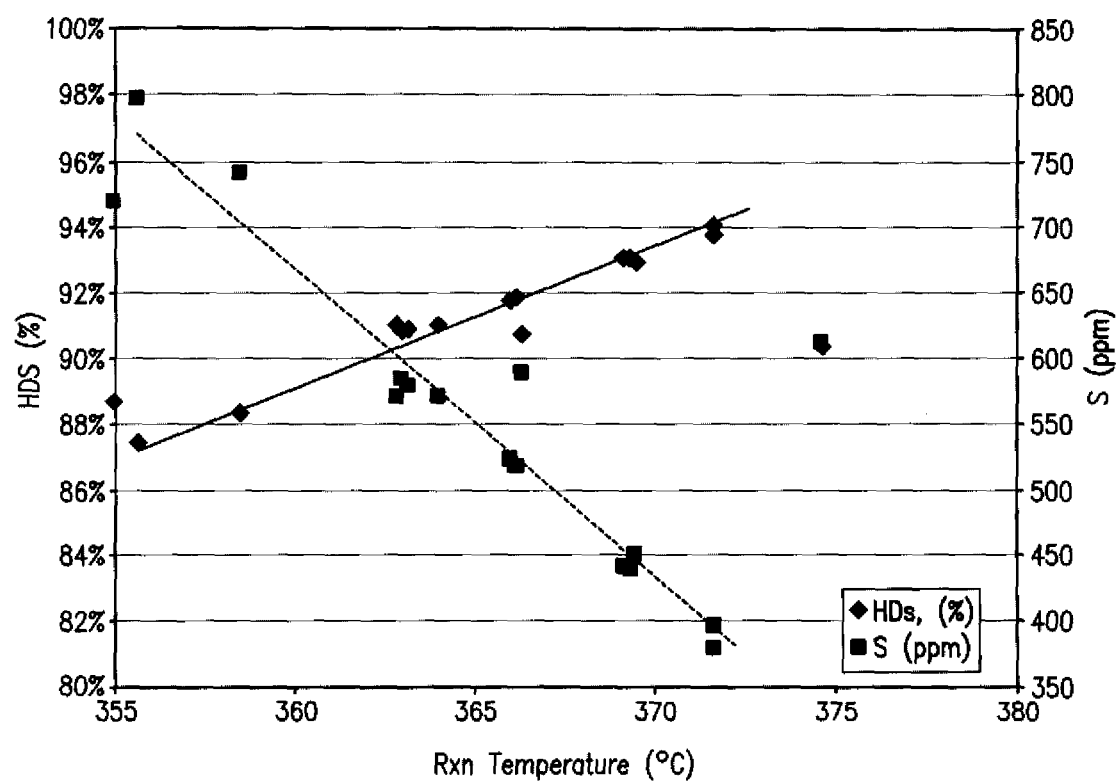
FIG. 3 shows results for sulfur removal from a feed under catalytic dewaxing conditions.

FIG. 3 shows results for treatment of a 130N raffinate feed under catalytic dewaxing conditions. The raffinate feed included about 6330 wppm of sulfur and about 66 wppm of nitrogen. The feed was exposed to dewaxing catalyst under catalytic dewaxing conditions including a temperature between about 355° C. and about 375° C. and an LHSV of about 0.5 hr$^{-1}$. The pressure during dewaxing was about 400 psig (about 2.8 MPag). The dewaxing catalyst was titania-bound ZSM-48 with a silica to alumina ratio of about 90:1 that further included 0.6 wt % of Pt as a metal hydrogenation component. Even under relatively sour conditions, the dewaxing catalyst was able to perform sulfur removal. This indicates that, in a sour environment, due to a direct cascade of effluent from a hydrotreatment reactor, dewaxing conditions should still be effective for removal of sulfur.

Example 5

Desulfurization of Feed by Hydrotreating Followed by Dewaxing

FIG. 4 shows results for treatment of a feed by hydrotreating followed by dewaxing. The feed in FIG. 4 contained about 2200 wppm of sulfur and about 93 wppm of nitrogen. The feed had an initial cloud point of about 4° C. The feed was hydrotreated using a commercially available hydrotreating catalyst under the temperature and space velocity conditions indicated in FIG. 4. The entire effluent from the hydrotreating was then cascaded without intermediate separation to a dewaxing stage. A catalyst including ZSM-48 with 0.6 wt % Pt was used in the dewaxing stage at the same temperature as the hydrotreating stage. The pressure for both stages was about 58 barg (about 840 psig, or about 5.8 MPag).

FIG. 4 shows that the dewaxing catalyst was effective for sulfur removal from a hydrotreated feed. The prior hydrotreatment can typically leave behind more difficult to remove sulfur compounds, such as hindered dibenzothiophenes. However, the dewaxing stage was able to remove at least about 80% of the sulfur from the hydrotreated composition. The exception was for one condition where the sulfur level after the hydrotreatment was less than 5 wppm. In addition, the dewaxing stage was capable of removing at least 90% of the sulfur for temperatures of about 370° C. or greater.

Example 6

Two Stage Reduction of Sulfur Levels

The following example describes conditions that could be used for two stage production of a diesel fuel product. In this prophetic example, a feed can be a diesel boiling range feed that includes from about 500 wppm to about 3000 wppm of sulfur. The feed can first be exposed to a hydrotreatment catalyst under effective hydrotreating conditions. The hydrotreating conditions can be selected to reduce the sulfur content. The hydrotreating reaction conditions can include an LHSV from about 0.3 hr$^{-1}$ to about 5.0 hr$^{-1}$, for example from about 0.5 hr$^{-1}$ to about 2.5 hr$^{-1}$, a total pressure from about 300 psig (about 2.1 MPag) to about 800 psig (about 5.5 MPag), for example from about 400 psig (about 2.8 MPag) to about 700 psig (about 4.8 MPag), and a temperature from about 700° F. (about 371° C.) to about 750° F. (about 399° C.).

The effluent from the hydrotreatment can be introduced, after a separation, into a dewaxing stage. The separated, hydrotreated effluent will contain at least about 100 wppm of sulfur and optionally but preferably less than about 500 wppm of sulfur. In the dewaxing stage, the separated, hydrotreated effluent can be dewaxed under effective dewaxing conditions. Dewaxing conditions can include a temperature from about 280° C. to about 380° C., a total pressure from about 300 psig (about 2.1 MPag) to about 800 psig (about 5.5 MPag), for example about 400 psig (about 2.8 MPag) to about 700 psig (about 4.8 MPag), and an LHSV from about 0.1 hr$^{-1}$ to about 5.0 hr$^{-1}$. The dewaxing catalyst can be, for example, an alumina-bound ZSM-48 with a silica to alumina ratio of less than about 200:1 including from about 0.5 wt % to about 2.0 wt % of Pt. The hydrotreated, dewaxed effluent can advantageously exhibit a sulfur content of about 10 wppm or less.

Example 7

Two Stage Reduction of Sulfur Levels

The following example describes conditions that could be used for two stage production of a diesel fuel product. In this prophetic example, a feed can be a diesel boiling range feed that includes between about 500 wppm and about 20000 wppm of sulfur, for example from about 1000 wppm to about 10000 wppm of sulfur. The feed can first be exposed to a hydrotreatment catalyst under effective hydrotreating conditions. The hydrotreating conditions can be selected to reduce the sulfur content. The hydrotreating reaction conditions can include an LHSV from about 0.3 hr$^{-1}$ to about 5.0 hr$^{-1}$, for example from about 0.5 hr$^{-1}$ to about 2.5 hr$^{-1}$, a total pressure from about 300 psig (about 2.1 MPag) to about 800 psig (about 5.5 MPag), for example from about 400 psig (about 2.8 MPag) to about 700 psig (about 4.8 MPag), and a temperature from about 700° F. (about 371° C.) to about 750° F. (about 399° C.). The effluent from the hydrotreatment can be introduced, after a separation, into a dewaxing stage. The separated, hydrotreated effluent can contain at least about to 200 wppm of sulfur and optionally but preferably less than about 500 wppm of sulfur. In the dewaxing stage, the separated, hydrotreated effluent can be dewaxed under effective dewaxing conditions. Dewaxing conditions can include a temperature from about 280° C. to about 380° C., a total pressure from about 300 psig (about 2.1 MPag) to about 800 psig (about 5.5 MPag), for example from about 400 psig (about 2.8 MPag) to about 700 psig (about 4.8 MPag), and an LHSV from about 0.1 hr$^{-1}$ to about 5.0 hr$^{-1}$. The dewaxing catalyst can be, for example, an alumina-bound ZSM-48 with a silica to alumina ratio of less than about 200:1 including from about 0.5 wt % to about 2.0 wt % of Pt. The hydrotreated, dewaxed effluent can advantageously exhibit a sulfur content of about 15 wppm or less.

The foregoing disclosure provides illustrative embodiments of the invention and is not intended to be limiting. As understood by those of skill in the art, the overall invention, as defined by the claims, encompasses other preferred embodiments not specifically enumerated herein.

What is claimed is:

1. A method for producing low sulfur distillate products, comprising:
    hydrotreating a feedstock having a boiling range from about 451° F. to about 800° F., and a sulfur content of at least about 1500 wppm and including fractions in the 600° F.+ boiling range containing sulfur species including alkyl-substituted dibenzothiophenes under hydrotreating conditions at a total pressure of 400 to 800 psig and a temperature from 500° F. to about 800° F. to produce a liquid effluent and a gas phase fraction;

separating the liquid effluent from contaminant hydrogen sulfide and ammonia gases formed during the hydrotreatment to form a liquid fraction having a sulfur content of at least about 200 wppm and a nitrogen content not more than 5 ppmw;

hydroprocessing at least a portion of the separated hydrotreated liquid fraction having a sulfur content of at least 200 wppm under dewaxing conditions at a total pressure of 300 to 800 psig and a temperature from 280° C. to about 380° C. in the presence of a catalyst having isomerization dewaxing activity and including at least one Group VIII noble metal on a bound zeolite, the bound zeolite comprising ZSM-48; and fractionating the hydroprocessed liquid fraction to produce a product fraction having a sulfur content of about 15 wppm or less, a nitrogen content of about 5 wppm or less, and a cloud point of about −15° C. or less.

2. The method of claim 1, wherein the hydrotreating conditions comprise a space velocity from about 0.3 hr$^{-1}$ to about 5.0 hr$^{-1}$.

3. The method of claim 1, wherein the effective hydrotreating conditions include a treat gas rate that provides an amount of hydrogen from about two times to about five times the hydrogen consumed during the hydrotreating.

4. The method of claim 1, wherein the dewaxing conditions include an LHSV from about 0.5 hr$^{-1}$ to about 5.0 hr$^{-1}$, and a hydrogen treat gas rate of from about two times to about fifteen times the hydrogen consumed during the dewaxing.

5. The method of claim 1, wherein
the at least one Group VIII metal on the bound zeolite comprises Pt and/or Pd.

6. A method for producing low sulfur distillate products, comprising:

hydrotreating a feedstock having a boiling range from about 451° F. to about 800° F., a sulfur content of at least about 1500 wppm and including fractions in the 600° F.+ boiling range containing sulfur species including alkyl-substituted dibenzothiophenes under hydrotreating conditions at a total pressure of 400 to 800 psig and a temperature from 500° F. to about 800° F.;

separating liquid effluent of the hydrotreating step from contaminant hydrogen sulfide and ammonia gases formed during the hydrotreatment to form a hydrotreated feedstock;

fractionating the hydrotreated feedstock in a first volume of a divided wall column fractionator to produce a liquid fraction and a first common fraction that is passed to an upper undivided volume of the fractionator, the liquid fraction having a sulfur content from about 200 wppm to about 500 wppm and a nitrogen content of not more than 5 ppmw;

hydroprocessing a portion of the liquid fraction having a sulfur content from about 200 wppm to about 500 wppm and a nitrogen content not more than 5 ppmw under dewaxing conditions at a total pressure of 300 to 800 psig and a temperature from 280° C. to about 380° C. in the presence of a catalyst having isomerization dewaxing activity and including at least one Group VIII noble metal on a bound zeolite, the bound zeolite comprising ZSM-48; and fractionating the hydroprocessed liquid fraction in a second volume of the divided wall column fractionator to produce at least a product fraction and a second common fraction that is passed to the upper undivided volume of the fractionator, the product fraction having a sulfur content of about 15 wppm or less, a nitrogen content of about 5 wppm or less, and a cloud point of about −15° C. or less.

7. The method of claim 6, wherein the hydrotreating conditions include a treat gas rate that provides an amount of hydrogen from about two times to about five times the hydrogen consumed during the hydrotreating.

8. The method of claim 6, wherein the hydrotreating conditions comprise a pressure from about 300 psig to about 800 psig a temperature from about 500° F. to about 800° F., and a space velocity from about 0.3 hr$^{-1}$ to about 5.0 hr$^{-1}$.

9. The method of claim 6, wherein the dewaxing conditions include a temperature from about 280° C. to about 380° C., a pressure from about 300 psig to about 800 psig an LHSV from about 0.5 hr$^{-1}$ to about 5.0 hr$^{-1}$, and a hydrogen treat gas rate of from about two times to about fifteen times the hydrogen consumed during the dewaxing.

10. The method of claim 6, wherein the height of the dividing wall is selected so that the product fraction contains about 1 wt % or less of material corresponding to the liquid fraction.

11. The method of claim 6, wherein the Group VIII metal on the bound zeolite is Pt, Pd, or a combination thereof.

12. The method of claim 6, wherein the Group VIII metal is Pt, and the amount of Group VIII metal on the bound zeolite is from about 0.1 wt % to about 1.5 wt %.

13. The method of claim 6, further comprising hydrofinishing the dewaxed liquid fraction under effective hydrofinishing conditions prior to fractionating the dewaxed liquid fraction, the effective hydrofinishing conditions including a temperature from about 180° C. to about 280° C., a total pressure from about 300 psig to about 800 psig, an LHSV from about 0.1 hr$^{-1}$ to about 5 hr$^{-1}$, and a hydrogen treat gas rate of from about two times to about five times the hydrogen consumed during the hydrofinishing.

14. A method for producing low sulfur distillate products, comprising:

hydrotreating a feedstock having a boiling range from about 451° F. to about 800° F., and a sulfur content of at least about 1500 wppm and including fractions in the 600° F.+ boiling range containing sulfur species including alkyl-substituted dibenzothiophenes under hydrotreating conditions to produce a hydrotreated effluent comprising a liquid fraction and a gaseous fraction comprising contaminant hydrogen sulfide and ammonia;

separating the liquid fraction from the contaminant hydrogen sulfide and ammonia to produce a liquid fraction having a sulfur content of about 200 to 500 wppm and a nitrogen content not more than 5 ppmw;

hydroprocessing at least a portion of the liquid fraction under dewaxing conditions at a total pressure of 300 to 800 psig and a temperature from 280° C. to about 380° C. in the presence of a catalyst having isomerization dewaxing activity Pt on ZSM-48; and fractionating the hydroprocessed liquid fraction to produce a product fraction, the product fraction having a sulfur content of about 15 wppm or less, a nitrogen content of about 5 wppm or less, and a cloud point of about −15° C. or less.

15. The method of claim 14, wherein the hydrotreating conditions include a treat gas rate that provides an amount of hydrogen from about two times to about five times the hydrogen consumed during the hydrotreating.

16. The method of claim 14, wherein the hydrotreating conditions comprise a space velocity from about 0.3 hr$^{-1}$ to about 5.0 hr$^{-1}$.

17. The method of claim 14, wherein the effective dewaxing conditions include an LHSV from about $0.5\ hr^{-1}$ to about $5.0\ hr^{-1}$, and a hydrogen treat gas rate of from about two times to about fifteen times the hydrogen consumed during the dewaxing.

* * * * *